US012529779B2

(12) United States Patent
Tsujimura

(10) Patent No.: US 12,529,779 B2
(45) Date of Patent: Jan. 20, 2026

(54) RADAR SYSTEM AND INSPECTION METHOD

(71) Applicant: KABUSHIKI KAISHA TOSHIBA, Tokyo (JP)

(72) Inventor: Kazuhiro Tsujimura, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 298 days.

(21) Appl. No.: 18/184,100

(22) Filed: Mar. 15, 2023

(65) Prior Publication Data

US 2024/0103155 A1 Mar. 28, 2024

(30) Foreign Application Priority Data

Sep. 20, 2022 (JP) ................................. 2022-149273

(51) Int. Cl.
*G01S 13/86* (2006.01)
*G01S 7/35* (2006.01)
*G01S 7/40* (2006.01)

(52) U.S. Cl.
CPC ............ *G01S 13/867* (2013.01); *G01S 7/354* (2013.01); *G01S 7/4008* (2013.01); *G01S 7/4021* (2013.01)

(58) Field of Classification Search
CPC ...... G01S 13/867; G01S 7/354; G01S 7/4008; G01S 7/4021
See application file for complete search history.

(56) References Cited

U.S. PATENT DOCUMENTS

| 6,674,893 B1* | 1/2004 | Abe ........................ G06T 7/521 356/610 |
| 10,495,748 B2 | 12/2019 | Daisy et al. |
| 2013/0135137 A1 | 5/2013 | Mulder et al. |
| 2013/0335531 A1* | 12/2013 | Lee ......................... G01B 11/25 348/46 |
| 2017/0082730 A1* | 3/2017 | Kishigami ........... H01Q 21/061 |
| 2018/0067204 A1* | 3/2018 | Frizzell ................. G01S 13/887 |

(Continued)

FOREIGN PATENT DOCUMENTS

| EP | 0831551 A2 | 3/1998 |
| JP | 2002350365 A | 12/2002 |

(Continued)

OTHER PUBLICATIONS

Kawasaki, et al., "Dynamic Scene Shape Reconstruction Using a Single Structured Light Pattern", 2008 IEEE Conference on Computer Vision and Pattern Recognition, 2008, pp. 1-8, DOI: 10.1109/CVPR.2008.4587702.

(Continued)

*Primary Examiner* — Vladimir Magloire
*Assistant Examiner* — Nazra Nur Waheed
(74) *Attorney, Agent, or Firm* — Holtz, Holtz & Volek PC

(57) ABSTRACT

According to one embodiment, a radar system for inspecting a target, includes transmit antennas, receive antennas, and a processing unit. The processing unit is configured to select at least one transmit antenna among the transmit antennas and at least one receive antenna among the receive antennas, based on a shape of the target, make the at least one transmit antenna transmit an electromagnetic wave, and make the at least one receive antenna receive the electromagnetic wave.

11 Claims, 13 Drawing Sheets

(56) References Cited

U.S. PATENT DOCUMENTS

| | | | |
|---|---|---|---|
| 2019/0064342 A1 | 2/2019 | Daisy et al. | |
| 2020/0319331 A1 | 10/2020 | Sheen et al. | |
| 2020/0393594 A1* | 12/2020 | Obata | G06V 40/10 |
| 2021/0111479 A1* | 4/2021 | Spalink | G01S 13/89 |
| 2021/0199755 A1 | 7/2021 | Emadi et al. | |
| 2021/0278519 A1 | 9/2021 | Mori | |
| 2021/0407134 A1* | 12/2021 | Schena | G06T 7/80 |
| 2022/0107407 A1 | 4/2022 | Zhu et al. | |
| 2023/0084807 A1* | 3/2023 | Taamazyan | G06T 7/521 |
| | | | 382/154 |

FOREIGN PATENT DOCUMENTS

| | | |
|---|---|---|
| JP | 2007024764 A | 2/2007 |
| JP | 2013538602 A | 10/2013 |
| JP | 2020204513 A | 12/2020 |
| JP | 2021139762 A | 9/2021 |
| JP | 2022059335 A | 4/2022 |
| WO | 2018078627 A1 | 5/2018 |

OTHER PUBLICATIONS

Skolnik, "Radar Handbook", Second Edition, McGraw-Hill, Inc., 1990, 846 pages.
Japanese Office Action (and an English language translation thereof) dated Jul. 1, 2025, issued in counterpart Japanese Application No. 2022-149273.

* cited by examiner

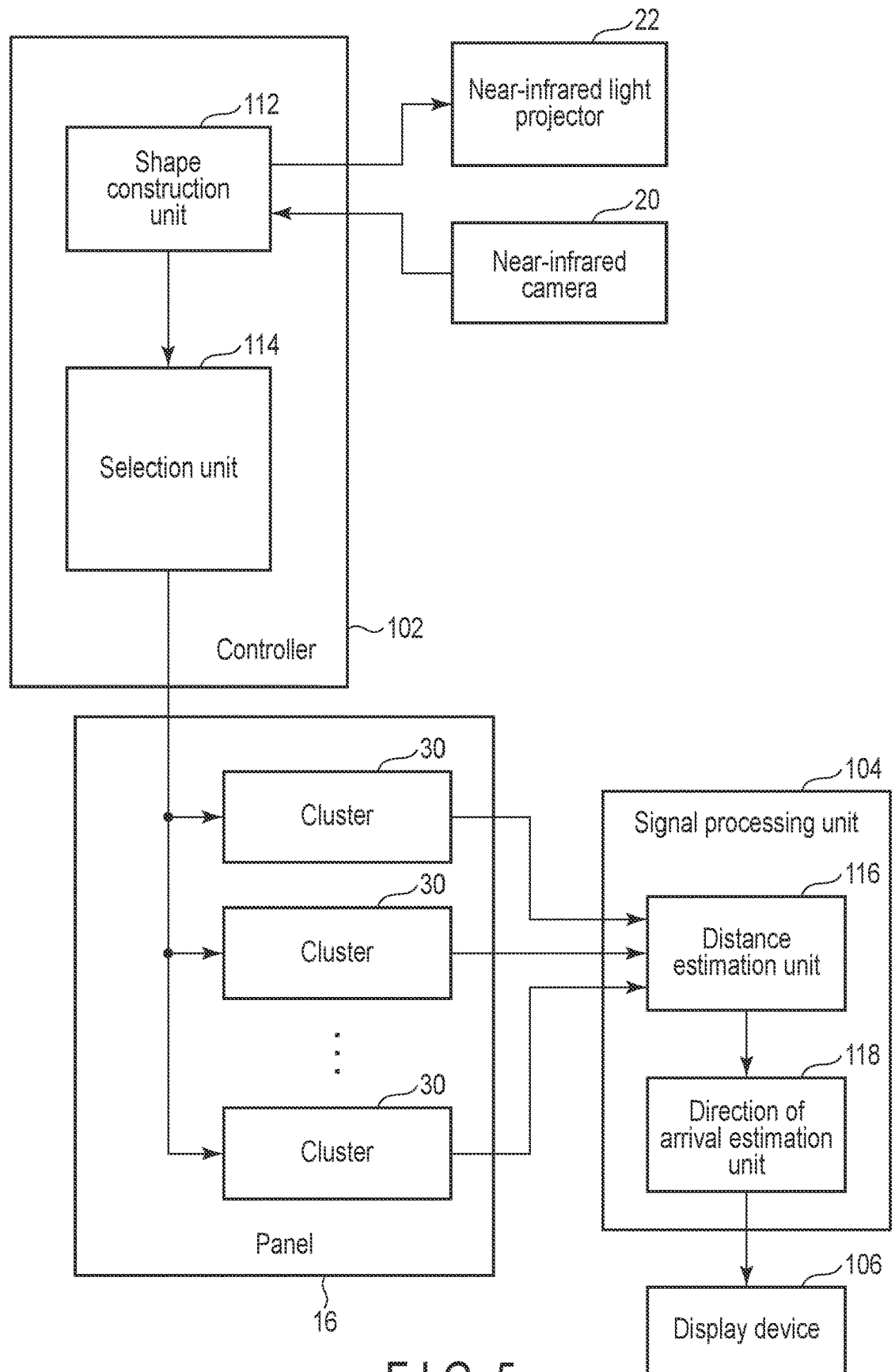
F I G. 5

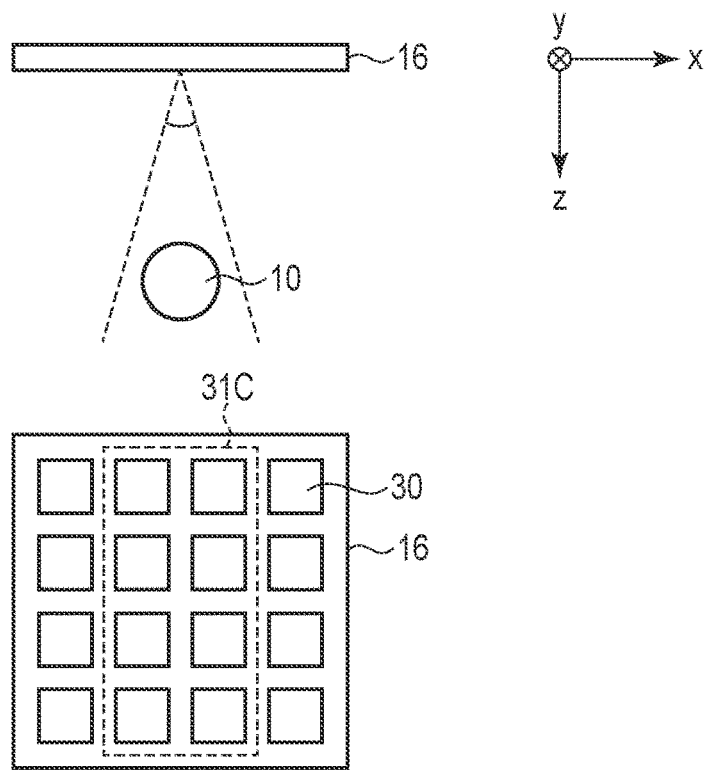
FIG. 9A
FIG. 9B
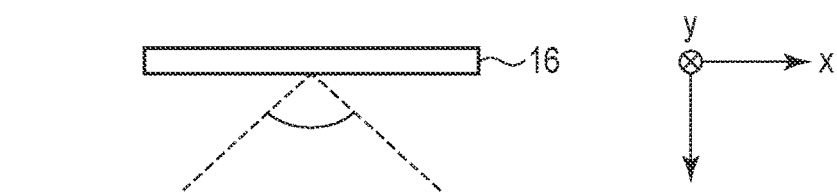
FIG. 10A
FIG. 10B

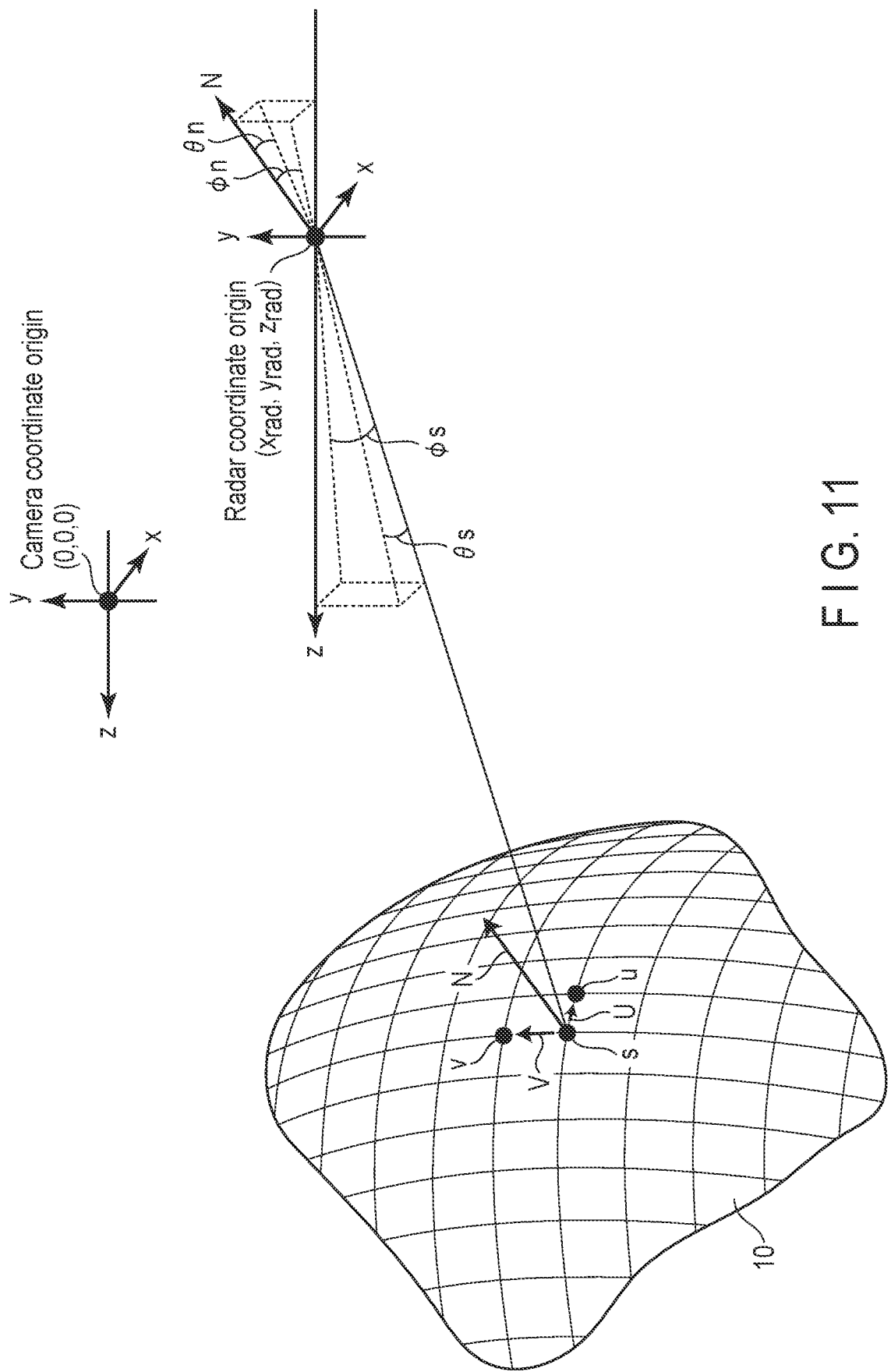
F I G. 11

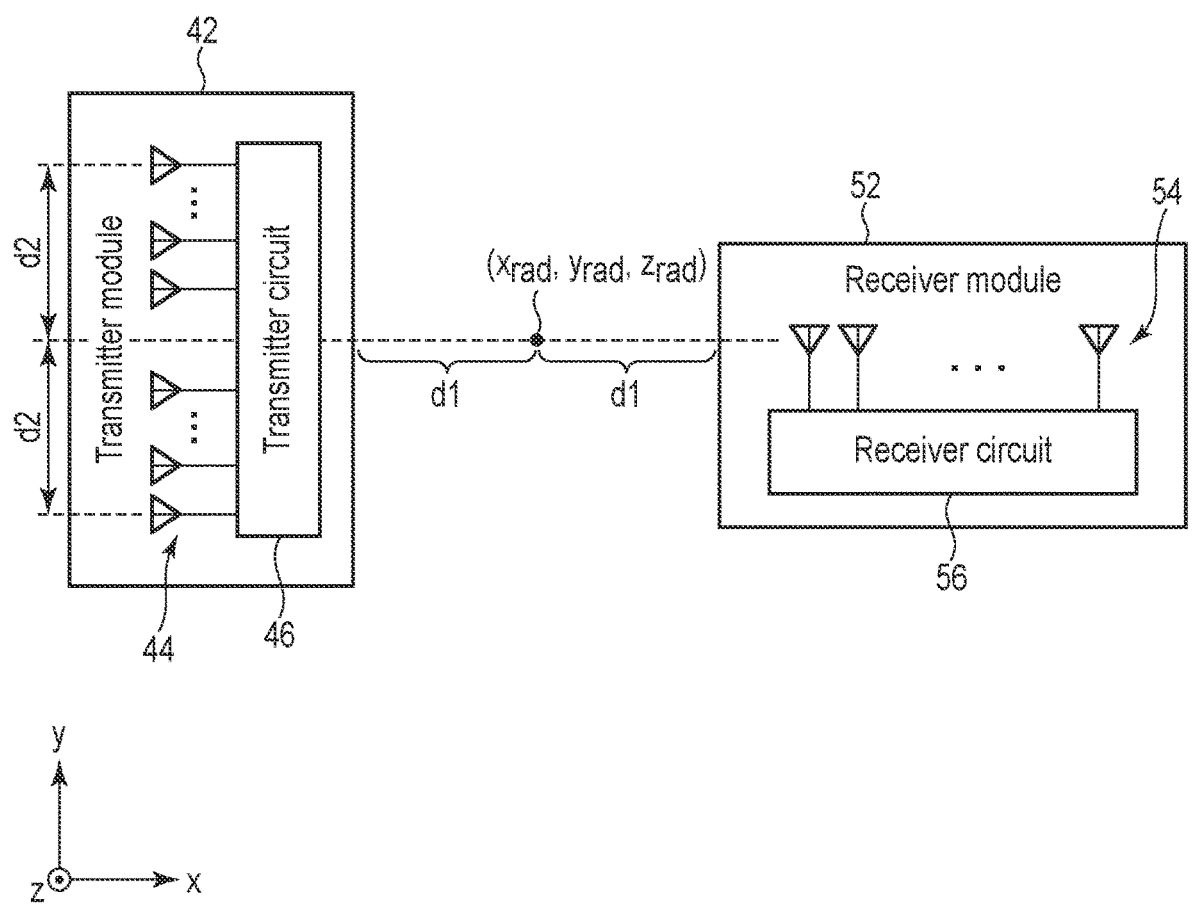
F I G. 12

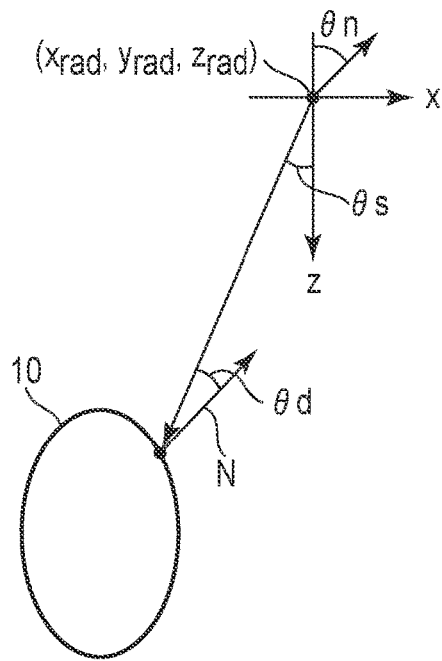 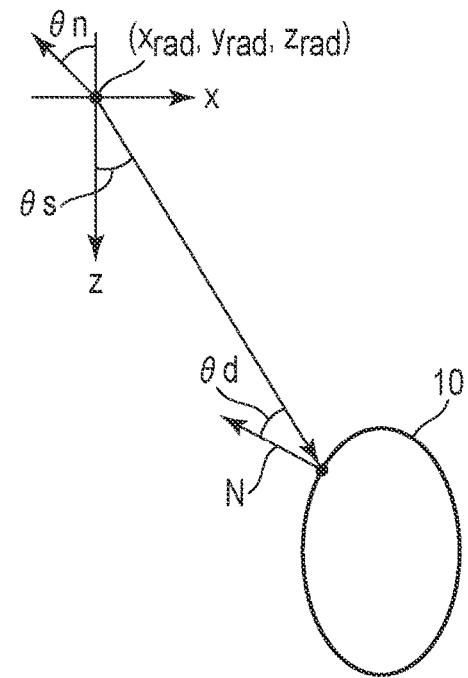
FIG. 13A   FIG. 13B
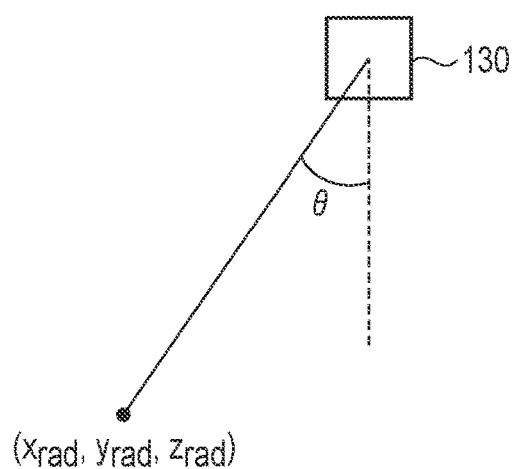 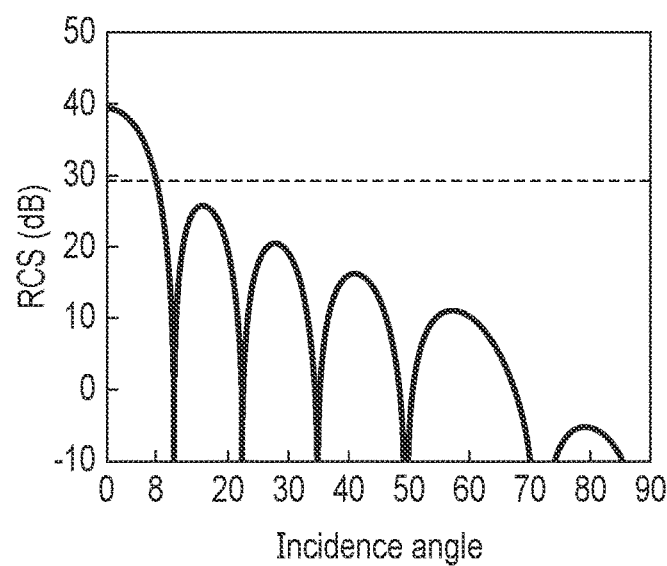
FIG. 14A   FIG. 14B

RADAR SYSTEM AND INSPECTION METHOD

CROSS-REFERENCE TO RELATED APPLICATIONS

This application is based upon and claims the benefit of priority from Japanese Patent Application No. 2022-149273, filed Sep. 20, 2022, the entire contents of which are incorporated herein by reference.

FIELD

Embodiments described herein relate generally to a radar system and an inspection method.

BACKGROUND

A radar system is expected to be applied in various fields of inspection, including automobiles, nondestructive inspection, medical field, security, and the like. Inspection accuracy is proportional to the number of antennas transmitting and receiving electromagnetic wave. To enhance the inspection accuracy, the number of antennas needs to be increased. The data size of the received signal becomes larger as the number of antennas is increased. The received signal is transmitted to a signal processing circuit. The signal processing circuit obtains information indicating the inspection result. When the data size of the received signal is large, the time required to transmit the received signal from a receiving circuit of the antenna to the signal processing circuit is long. If the data size of the received signal is large, the time for signal processing is also long. When the inspection needs to be periodically executed, the inspection cycle cannot be shortened if the data size of the received signal is large.

BRIEF DESCRIPTION OF THE DRAWINGS

FIG. 5 is a block diagram illustrating an example of circuit configuration of the radar system according to the first embodiment.

FIG. 9A shows a plan view illustrating example of selecting the cluster according to the position of the inspection target according to the first embodiment.

FIG. 9B illustrates the example of selecting the cluster according to the position of the inspection target according to the first embodiment.

FIG. 10A shows a plan view illustrating another example of selecting the cluster according to the position of the inspection target according to the first embodiment.

FIG. 10B illustrates the other example of selecting the cluster according to the position of the inspection target according to the first embodiment.

FIG. 11 is a view illustrating an example of a normal of the inspection target in the radar system according to the first embodiment.

FIG. 12 shows an example of the radar coordinate origin of a certain cluster according to the first embodiment.

FIG. 13A shows an example of an angle difference in a case where the azimuth angle is a negative angle and its absolute value is 30 degrees or more.

FIG. 13B shows an example of the angle difference in a case where the azimuth angle is a positive angle and its absolute value is 30 degrees or more.

FIG. 14A is a view illustrating an example of an allowable angle according to the first embodiment.

FIG. 14B shows a result of a theoretical calculation of a radar cross section according to the first embodiment.

DETAILED DESCRIPTION

Figure 1:
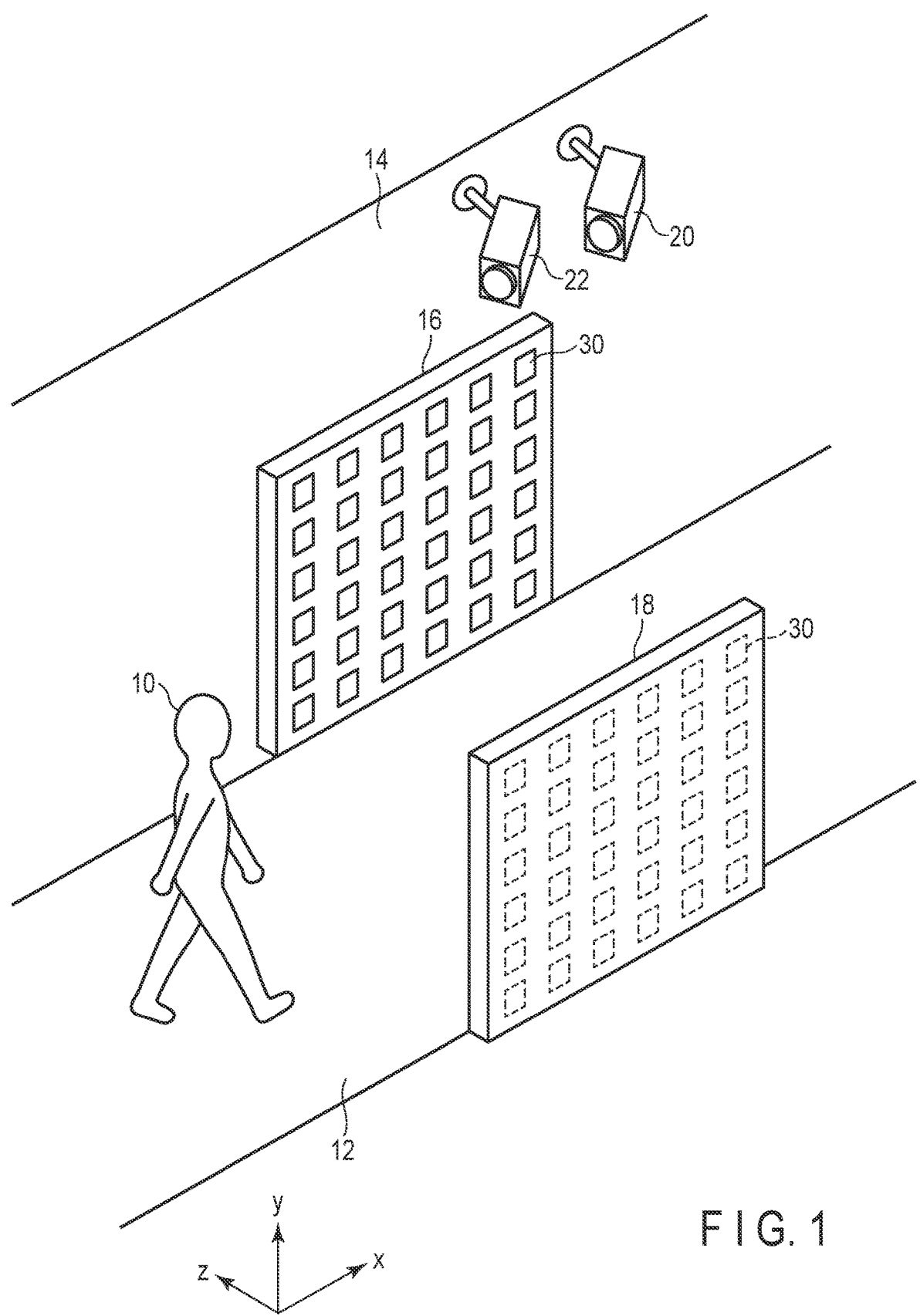
FIG. 1 is a diagram illustrating an example of a radar system according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their, detailed descriptions may be omitted unless necessary.

In general, according to one embodiment, a radar system for inspecting a target, comprising:
transmit antennas;
receive antennas; and
a processing unit connected to the transmit antennas and the receive antennas, wherein
the processing unit is configured to
select at least one transmit antenna among the transmit antennas and at least one receive antennas among the receive antennas, based on a shape of the target,
make the at least one transmit antenna transmit an electromagnetic wave, and
make the at least one receive antennas receive the electromagnetic wave.

First Embodiment

FIG. 1 is a diagram illustrating an example of arrangement of a radar system according to the first embodiment.

An example of the radar system relates to, for example, a security system installed in facilities where a number of persons gather, such as train stations, bus terminals, airports, shopping malls, concert halls, and exhibition halls. FIG. 1 shows an example of inspecting whether or not a walking inspection target 10 possesses a predetermined object. The predetermined object is so-called a hazardous material that is not permitted to be possessed at the location where the radar system is installed. Examples of a hazardous material are metal objects such as handguns and knives, powder such as explosives, and liquids such as gasoline. Examples of a hazardous material may also be powder of narcotics and the like or illegal items such as gold bars. The first embodiment can inspect the inspection target 10 which is not only in a walking state, but also in a stationary state. The inspection target 10 is, for example, a person or luggage. When the inspection target is a person, the inspection target also implies clothing, articles in the clothing, and articles possessed or carried by the person. When the inspection target is luggage, the inspection target also implies packing of the luggage.

A panel 16, a near-infrared camera 20, and a near-infrared light projector 22 are installed at one side wall 14 of a passage 12 of the inspection target 10. The passage 12 implies a ticket gate of a station, a room access control gate, and the like. The passage 12 may be an area where a large number of persons can pass and stay. A panel 18 is installed at the other side wall of the passage 12. A longitudinal direction of the passage 12 is referred to as an x direction. A height direction of the passage 12 is referred to as a y direction. A width direction of the passage 12 is referred to as a z direction.

The panels 16 and 18 are parallel to each other. An electromagnetic wave transmitting and receiving area of the panels 16 and 18 is referred to as an inspection area. Providing two panels 16 and 18 is not indispensable, but only one panel may be provided.

An example of the shape of the panels 16 and 18 is a rectangular shape. A side part on a near side and a side part on a far side of the panels 16 and 18 may be bent toward the center. In this case, the electromagnetic waves from the panels 16 and 18 are efficiently emitted to the inspection target 10 located in the center of the inspection area.

Each of the panels 16 and 18 comprises a plurality of clusters 30. The cluster 30 is a transmitter/receiver unit serving as a unit of transmit/receive control. The number and arrangement of the clusters 30 are determined such that the panels 16 and 18 transmit electromagnetic waves to the entire area of the inspection target 10 of a standard size and receive reflected waves from the entire area of the inspection target 10. The standard size is a two-dimensional shape (also referred to as an outline) in a case where the inspection target 10 is projected onto panel surfaces.

An example of the electromagnetic wave is an electromagnetic wave having a wavelength of 1 centimeter to 1 millimeter (with a frequency of 30 GHz to 300 GHz), which is also referred to as a millimeter wave. Another example of the electromagnetic wave is an electromagnetic wave having a wavelength of 1 millimeter to 100 micrometers (with a frequency of 300 GHz to 3 THz), which is also referred to as a submillimeter or terahertz wave.

The electromagnetic wave emitted to the inspection target 10 is reflected on a skin of the inspection target 10. The electromagnetic wave is also reflected on metals such as handguns and knives. The metal reflectance is higher than the reflectance of the skin. The intensity of the reflected wave from the metal is higher than the intensity of the reflected wave from the skin. In addition, the electromagnetic wave is absorbed by powder such as explosives. The reflectance of powder is lower than that of skin. The intensity of the reflected wave is determined depending on the type of material at the point where the electromagnetic wave is reflected, such as skin, metal, or powder. The radar system can determine the type of substance at the point of reflection from the strength of the reflected wave (strength of the received signal) and can inspect hazardous materials hidden in the clothing.

The near-infrared light projector 22 projects a near-infrared light pattern onto the inspection area. Examples of the pattern are grids and stripes. The near-infrared camera 20 captures near-infrared images of the inspection area. The near-infrared light pattern projected onto the inspection target 10 is distorted according to a three-dimensional shape of the inspection target 10. Three-dimensional shape data of the inspection target 10 is obtained based on the distortion of the near-infrared light pattern captured by the near-infrared camera 20. The three-dimensional shape data also represents the position of the inspection target 10 relative to the radar system. The near-infrared camera 20 can be replaced on various detection units that can acquire the shape of the inspection target 10. For example, a 3D camera of Time of Flight (ToF) or stereo format, or the like for capturing the three-dimensional shape can be used. In this case, the near-infrared light projector 22 is unnecessary.

For the inspection target 10 of a standard size, each of the panels 16 and 18 transmits the electromagnetic wave to the entire area of the inspection target 10 and receives the reflected wave from the entire area of the inspection target 10. However, several clusters 30 of the panels 16 and 18 do not transmit the electromagnetic wave to the inspected target 10, or several clusters 30 of the panels 16 and 18 do not receive the electromagnetic wave from the inspected target 10, depending on the body shape, posture, and position of the inspected target 10. It is wasteful to operate several clusters 30 that do not contribute to transmitting or receiving of the electromagnetic wave on the inspection target 10. The radar system of the embodiment selects the clusters to be used for transmitting and receiving of the electromagnetic wave, based on the three-dimensional shape and location of the inspection target 10.

When the near-infrared camera 20 captures an image of the inspection target 10, the radar system recognizes the presence of the inspection target 10 in the inspection area and starts emitting the electromagnetic wave. The radar system does not process a useless received signal that does not contribute to the inspection since the radar system emits the electromagnetic wave and obtains the received signal only when the inspection target 10 exists in the inspection area.

Figure 2:
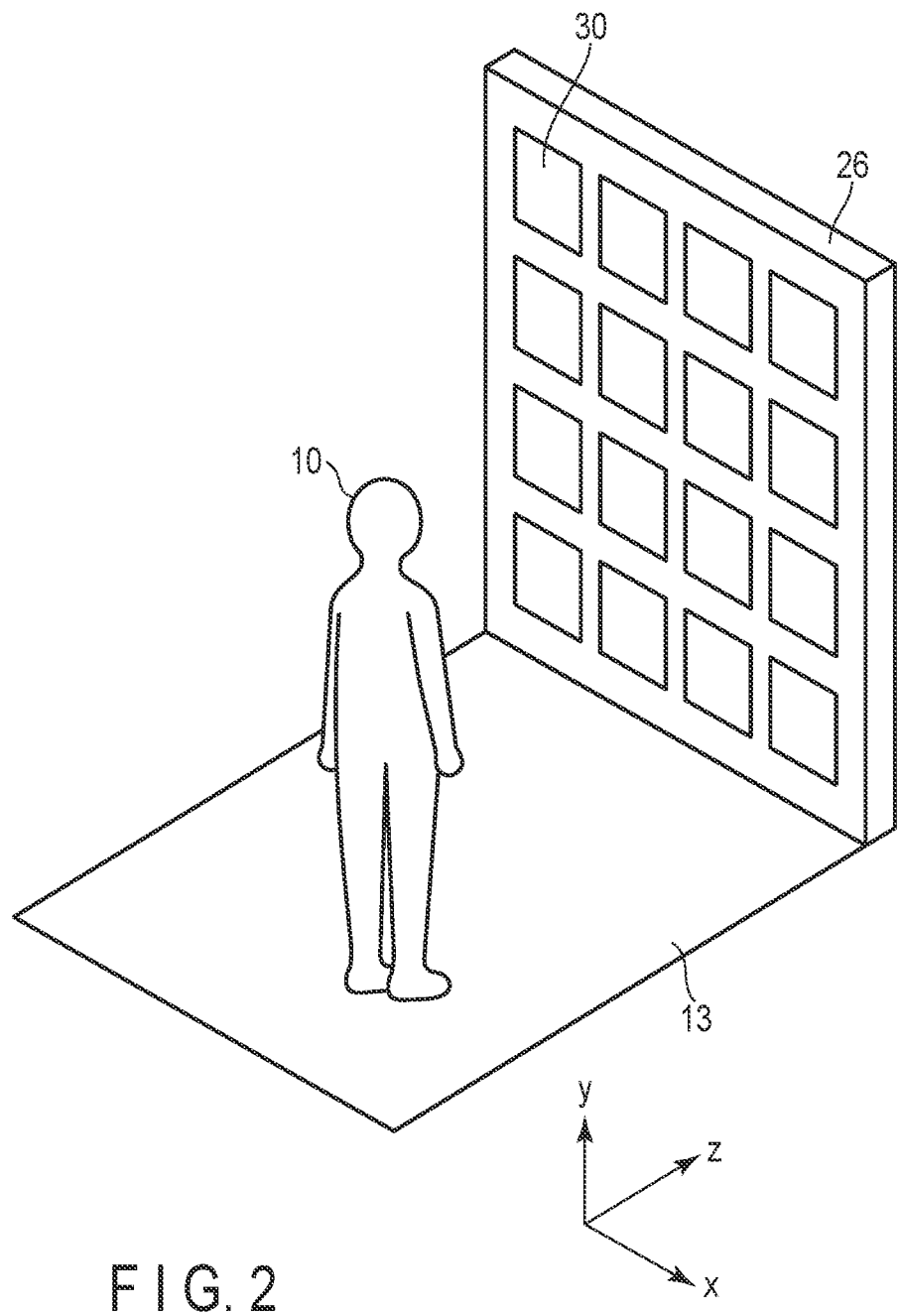
FIG. 2 is a diagram illustrating another example of the radar system according to the first embodiment.

FIG. 2 is a diagram illustrating another example of the configuration of the radar system according to the first embodiment. One panel 26 is installed at one end of a floor surface 13 of the inspection area. The inspection target 10 stands on the floor surface 13 of the inspection area such that its front side faces the panel 26. The panel 26 emits the electromagnetic wave onto the front face of the inspection target 10. The front side of the inspection target 10 is inspected. Similarly to the panels 16 and 18, one side part on the right side and one side part on the left side of the panel 26 may be bent toward the center of the floor surface 13.

After the front side is inspected, the inspection target 10 is turned 180 degrees such that its back side faces the panel 16. Thus, the back side of the inspection target 10 is also inspected. Two panels may be arranged in front of and behind the floor surface 13 such that the front and back sides of the inspection target 10 can be inspected simultaneously.

Figure 3:
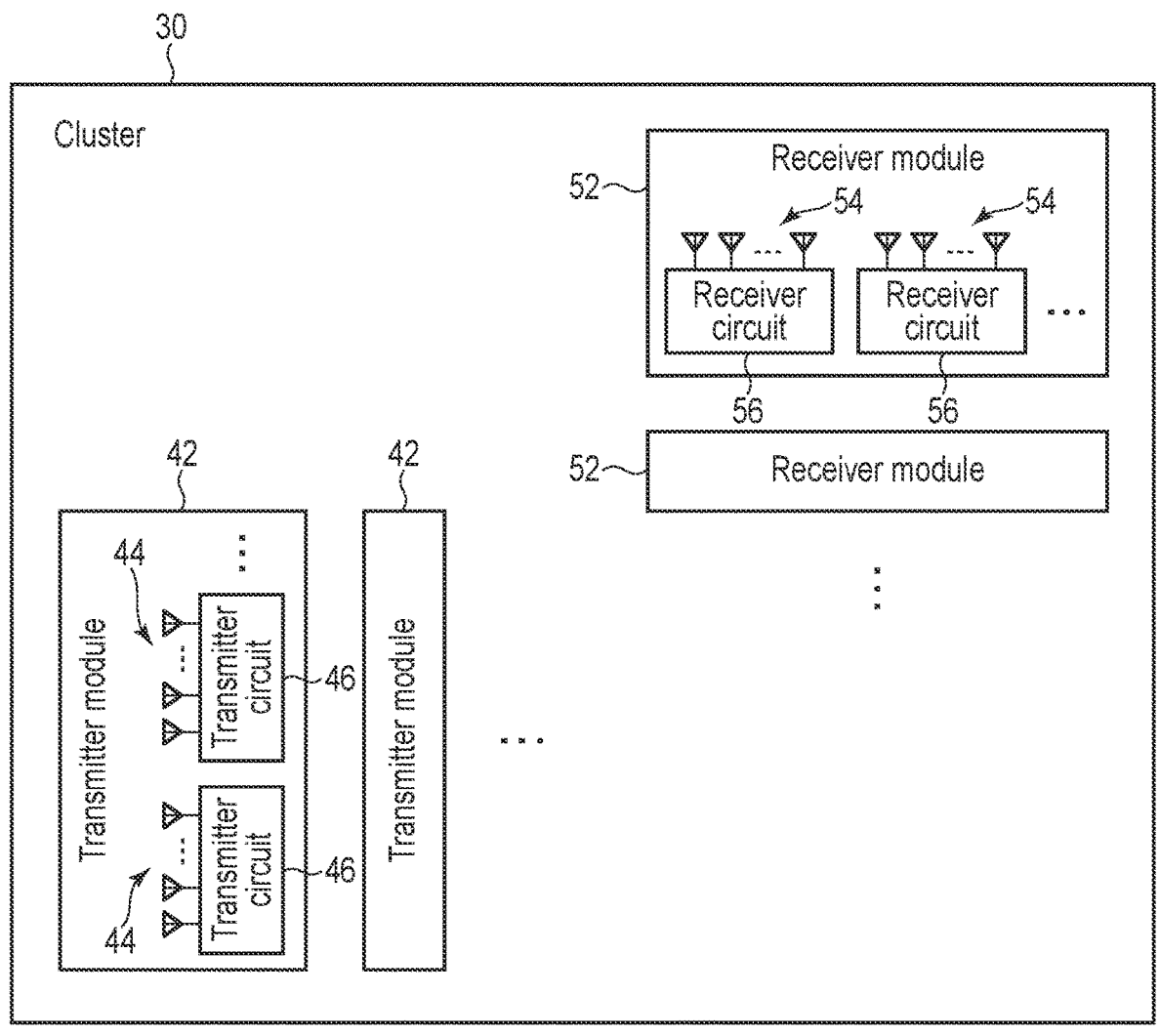
FIG. 3 is a diagram illustrating an example of a cluster according to the first embodiment.

FIG. 3 is a diagram illustrating an example of the cluster 30 according to the first embodiment. One cluster 30 comprises at least one transmitter module 42 and at least one receiver module 52. At least one transmitter module 42 and at least one receiver module 52 are arranged on a substrate of the cluster 30. An example of the substrate shape of the cluster 30 is a rectangular shape.

The transmitter module 42 comprises a plurality of transmitter circuits 46. Each of the transmitter circuits 46 is connected to a plurality of transmit antennas 44. A plurality of the transmit antennas 44 form a single transmit array antenna. For example, one transmitter module 42 comprises four transmitter circuits 46. One transmitter circuit 46 comprises one transmit array antenna formed of four transmit antenna 44. One transmitter module 42 comprises four transmit array antennas. The transmitter circuit 46 may be formed of an integrated circuit.

A plurality of the transmit antennas 44 and a plurality of the transmitter circuits 46 are arranged on a single substrate of the transmitter module 42. An example of the shape of the substrate of the transmitter module 42 is a rectangular shape. All the transmit antennas 44 may be arranged in a straight line or two-dimensionally. All the transmit antennas 44 may be arranged at equal intervals, for example, at intervals of one wavelength. A plurality of the transmit antennas 44 may be arranged at unequal intervals. An example of an unequally spaced array antenna is a Minimum Redundancy Array (MRA) antenna. In the MRA antenna, the maximum aperture length is implemented with the same number of antennas by minimizing the redundancy of the antenna intervals.

A virtual array antenna can be efficiently formed and the array aperture length can be increased by utilizing the unequally spaced array antenna. For this reason, high resolution can be implemented in the image generation using the estimation of the direction of arrival and synthetic aperture processing.

The transmitter circuit 46 comprises a reference signal generator, an amplifier, and a phase shifter. The reference signal generator generates a linear frequency modulated continuous wave (L-FMCW) (hereinafter referred to as a chirp signal) whose frequency increases linearly as the time elapses. The amplifier amplifies the chirp signal to a predetermined power. The phase shifter adjusts the phase of the amplified chirp signal to a predetermined phase. The phase shifter adjusts a phase of the amplified chirp signal to a predetermined phase. The phase shifter supplies the output to the transmit antennas 44. At least one of a plurality of the transmit antennas 44 connected to the transmitter circuit 46 or all of a plurality of the transmit antennas 44 transmit one chirp wave. When one transmitter circuit 46 transmits one chirp wave at a certain timing, another transmitter circuit 46 transmits a next chirp wave at a next timing. Thus, a plurality of the chirp waves are sequentially transmitted from a plurality of transmitter circuits 46.

The receiver module 52 comprises a plurality of receiver circuits 56. Each of the receiver circuits 56 is connected to a plurality of receive antennas 54. A plurality of the receive antennas 54 form a single receive array antenna. For example, one receiver module 52 comprises four receiver circuits 56. One receiver circuit 56 comprises one receive array antenna formed of four receive antennas 54. One receiver module 52 comprises four receive array antennas. The receiver circuit 56 may be formed of an integrated circuit.

A plurality of the receive antennas 54 and a plurality of the receiver circuits 56 are arranged on a single substrate of the receiver module 54. An example of the shape of the substrate of the receiver module 52 is a rectangular shape. All the receive antennas 54 may be arranged in a straight line or in a two-dimensional arrangement. All the receive antennas 54 may be arranged at equal intervals, for example, at intervals of one wavelength. A plurality of the receive antennas 54 may be arranged at unequal intervals. An example of the unequally spaced array antenna is an MRA antenna.

The receiver circuit 56 comprises an amplifier, a frequency converter, and an analog-to-digital converter (ADC). The electromagnetic wave emitted to the inspection target 10 is reflected on the inspection target 10. A plurality of the receiver circuits 56 receive the reflected wave simultaneously. The receiver circuit 56 receives the reflected wave by at least one of a plurality of the receive antennas 56 or all of a plurality of the receive antennas 56. The amplifier amplifies the received signal from the receive antenna to a predetermined power. The amplifier transmits the amplified received signal to a frequency conversion unit. The frequency conversion unit mixes the transmitted signal input to the transmit antenna and the received signal to generate a received intermediate frequency signal (received IF signal). The frequency conversion unit transmits the received IF signal to the ADC. The ADC converts the received IF signal into a digital signal.

The arrangement of the transmitter module 42 and the receiver module 52 on the substrate of the cluster 30 is arbitrary. When the transmit antennas 44 and the receive antennas 54 are both arranged in a straight line, the transmitter module 42 is arranged on the substrate of the cluster 30 such that the alignment direction of the transmit antennas 44 is parallel to one of two directions defining the rectangular shape of the substrate of the cluster 30, for example, the y-axis direction. The receiver module 52 is arranged on the substrate of the cluster 30 such that the alignment direction of the receive antennas 54 is parallel to the other of two directions defining the rectangular shape of the substrate of the cluster 30, for example, the x-axis direction. Since "transmit" and "receive" are interchangeable, "transmitter" in FIG. 3 may be replaced by "receiver", and "receiver" in FIG. 3 may be replaced by "transmitter".

Figure 4:
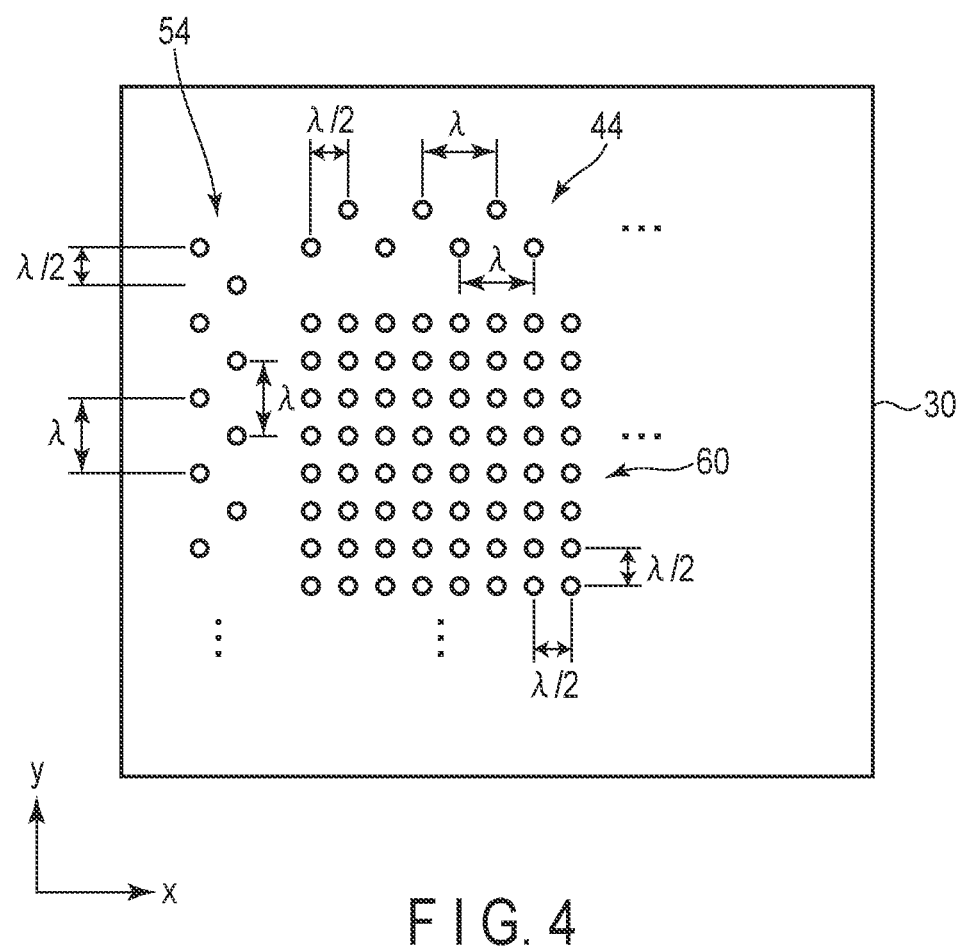
FIG. 4 is a diagram illustrating an example of transmit and receive antenna of the cluster according to the first embodiment.

FIG. 4 is a diagram illustrating an example of transmit and receive antenna of the cluster 30 according to the first embodiment. Each of the number of transmitter modules 42 and the number of receiver modules 52 is assumed to be two. The transmit antennas 44 provided in two transmitter modules 42 are arranged in two rows along the x-axis direction. The antenna interval of the transmit antennas 44 in each row is one wavelength ($\lambda$). The positions in the x-axis direction of the transmit antennas 44 in the first row are not the same as the positions in the x-axis direction of the transmit antennas 44 in the second row, and are shifted by half a wavelength ($\lambda/2$). The receive antennas 54 provided in two receiver modules 52 are arranged in two columns along the y-axis direction. The antenna interval of the receive antennas 54 in each column is one wavelength. The positions in the y-axis direction of the receive antennas 54 in the first column are not the same as the positions in the y-axis direction of the receive antennas 54 in the second column, and are shifted by half a wavelength. A virtual array antenna 60 is implemented by the transmit antennas 44 and the receive antennas 54 in this arrangement. The antenna interval of the virtual array antenna 60 is half a wavelength.

FIG. 5 is a block diagram illustrating an example of circuit configuration of the radar system according to the first embodiment. A controller 102 is connected to the panel 16 (or 18 or 26) comprising a plurality of the clusters 30. The controller 102 comprises a shape construction unit 112 and a selection unit 114. The near-infrared light projector 22 and the near-infrared camera 20 are connected to the shape construction unit 112.

Figure 6:
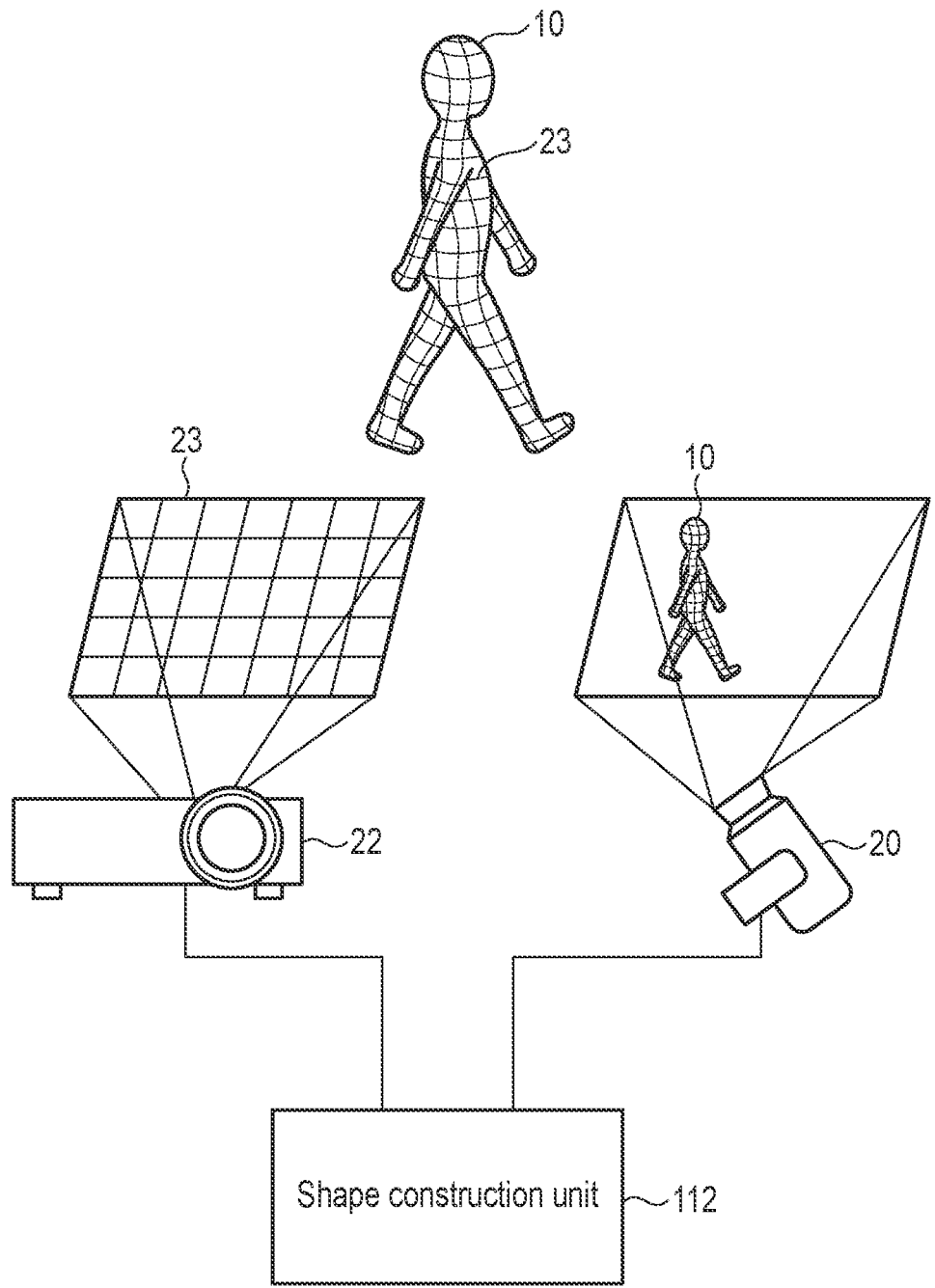
FIG. 6 is a view illustrating an example of a shape construction unit in the radar system according to the first embodiment.

FIG. 6 is a view illustrating an example of the shape construction unit 112 in the radar system according to the first embodiment. The near-infrared light projector 22 projects a near-infrared light pattern (in this case, a grid pattern) 23 onto the inspection target 10 in the inspection area. The near-infrared camera 20 captures near-infrared images of the inspection area. The near-infrared light pattern projected onto the inspection target 10 is distorted according to a three-dimensional shape of the inspection target 10.

The shape construction section 112 receives the grid pattern 23 projected by the near-infrared light projector 22 and the near-infrared light pattern captured by the near-infrared camera 20. The shape construction section 112 calculates three-dimensional coordinates of the grid points on the surface of the inspection target 10 according to the principle of triangulation from the coordinates of each grid point of the projected pattern 23 and the captured pattern on the camera image, and generates three-dimensional shape data of the inspection target 10. The shape construction unit 112 transmits the three-dimensional shape data to the selection unit 114. The three-dimensional shape data represents the two-dimensional body shape and posture relating to the outline of the inspection target 10 and the three-dimensional body shape and posture relating to the irregularities. The body shape implies obese, slender, and the like. The posture implies upright, forward leaning, forward bending, backward leaning, and the like. Since the three-dimensional shape data are the coordinates of grid points, the position of the inspection target 10 relative to the radar system can also be understood from the three-dimensional shape data.

As an example of generation of the three-dimensional shape data, a method described in Hiroshi Kawasaki, Ryo Furukawa, Ryusuke Sagawa and Yasushi Yagi, "Dynamic scene shape reconstruction using a single structured light pattern", 2008 IEEE Conference on Computer Vision and Pattern Recognition, 2008, pp. 1-8, doi: 10.1109/CVPR.2008.4587702 can be applied.

High angular resolution is required when the radar system detects a plurality of adjacent targets in clothing. The angular resolution at the direction of arrival estimation is determined based on the aperture length of the array antenna. When the antenna interval is set to be longer than half a wavelength, grating lobes may be generated and a number of antennas forming the array antenna need to be densely aligned. When a large number of antennas are densely aligned, a large amount of data transfer and data processing occur.

The selection unit 114 selects one transmitter cluster 30 that transmits an electromagnetic wave to the inspection target 10 and at least one receiver cluster 30 that receives the reflected wave in accordance with the three-dimensional shape data of the inspection target 10. The selection unit 114 selects one transmitter module 42 from among all the transmitter modules 42 of the selected transmitter cluster 30. The selection unit 114 selects one transmitter circuit 46 from among all the transmitter circuits 46 of the selected transmitter module 42. The selected transmitter circuit 46 transmits electromagnetic wave. When the transmission of the selected transmitter circuit 46 is ended, the selection unit 114 selects another transmitter circuit 46.

The selection unit 114 selects at least one receiver module 52 from among all the receiver modules 52 of the at least one receiver cluster 30. The selection unit 114 selects at least one receiver circuit 56 from among all the receiver circuits 56 of the at least one receiver module 52. If a plurality of the receiver circuits 56 are selected, a plurality of the receiver circuits 56 operate simultaneously and receive the reflected wave simultaneously.

As a result, the electromagnetic wave that is not related to the inspection is not transmitted or received and the received signal that is not related to the inspection is not collected. Therefore, the data size of the received signal can be minimized, and the transfer time of the received signal between the panel 16 and the signal processing unit 104 and the signal processing time can also be shortened.

Figure 7A:
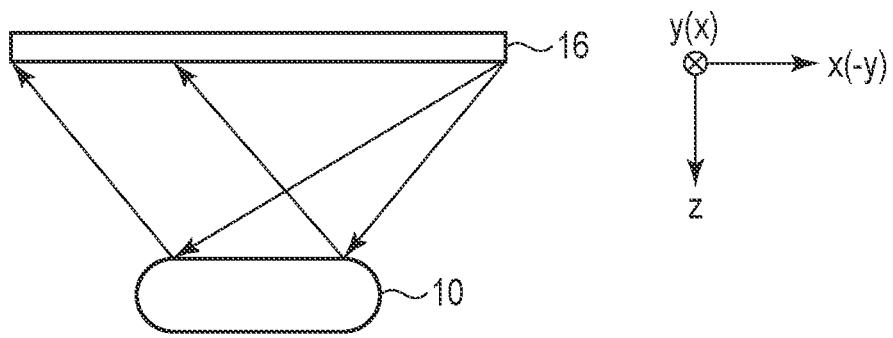
FIG. 7A shows a plan view illustrating example of selecting the cluster according to the body shape of the inspection target according to the first embodiment.
Figure 7B:
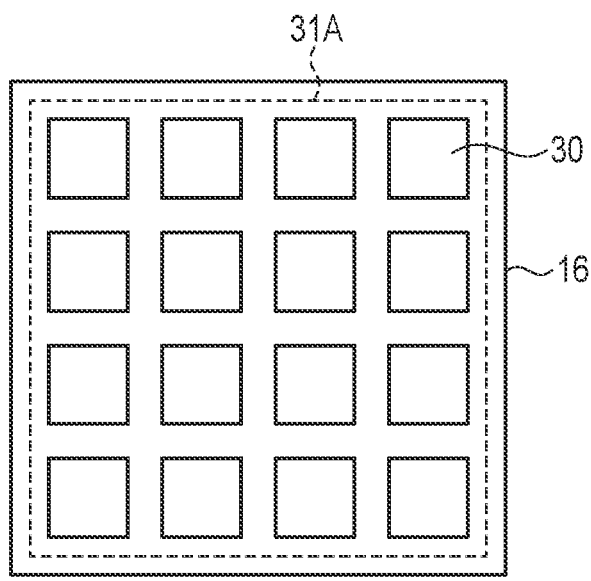
FIG. 7B shows illustrates the example of selecting the cluster according to the body shape of the inspection target according to the first embodiment.
Figure 8A:
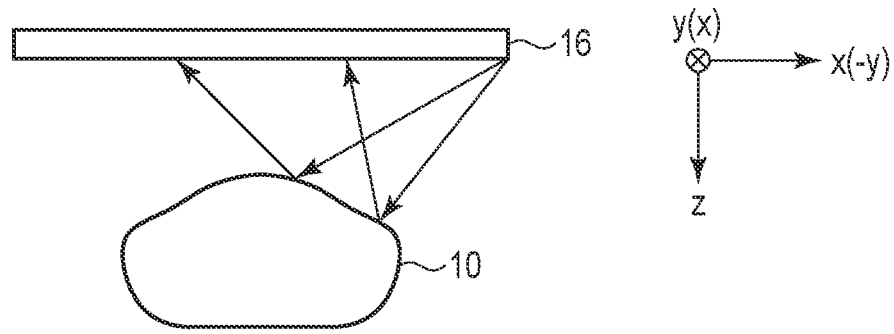
FIG. 8A shows a plan view illustrating another example of selecting the cluster according to the body shape of the inspection target according to the first embodiment.

FIGS. 7A, 7B, 8A, and 8B are diagrams illustrating an example of cluster selection in the radar system according to the first embodiment. FIGS. 7A, 7B, 8A, and 8B show a situation of selecting the cluster according to the body shape of the inspection target 10. FIG. 7A and FIG. 8A show plan views of the inspection target 10 viewed from the upper side of the radar system. FIG. 7A and FIG. 8A are side views of the inspection target 10 in a case of viewing the radar system rotated at 90 degrees in the counterclockwise direction. The shape of the inspection target 10 in FIG. 7A and FIG. 8A indicates a shape of the three-dimensional shape data projected onto the x-z plane or the y-z plane.

FIG. 7A shows a slim inspection target 10. The slim inspection target 10 has an approximately flat surface on the surface of the panel 16 side, i.e., the reflective surface of the electromagnetic wave. All the transmit antennas on the panel 16 transmit the electromagnetic waves to all points on the surface of the inspection target 10 parallel to the panel 16. All the receive antennas on the panel 16 receive the reflected waves from all points on the surface of the inspection target 10 parallel to the panel 16. For this reason, when the cross-sectional shape or side shape of the inspection target 10 is the shape shown in FIG. 7A, the selection unit 114 selects all the clusters 30 as transmitter and receiver clusters 31A, as shown in FIG. 7B. In other words, all the clusters 30 are sequentially selected as the transmitter clusters, and all the clusters 30 are simultaneously selected as the receiver clusters.

Figure 8B:
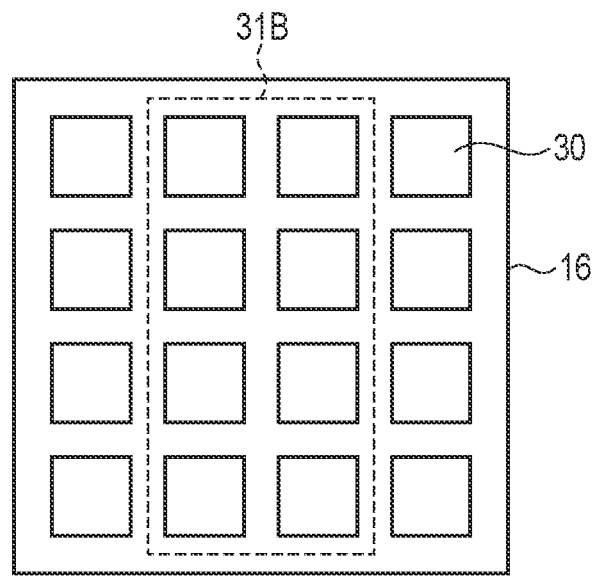
FIG. 8B shows illustrates the other example of selecting the cluster according to the body shape of the inspection target according to the first embodiment.
Figure 8B:
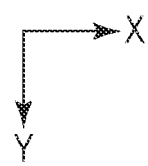

FIG. 8A shows an obese inspection target 10. The obese inspection target 10 has a surface on the panel 16 side, i.e., the reflective surface of electromagnetic wave, protruding toward the panel 16. The transmit antenna on one peripheral portion in the x direction on the panel 16 transmits an electromagnetic wave to one peripheral portion in the x direction on the surface of the inspection target 10, but not to the other peripheral portion. For this reason, when the cross-sectional shape or side shape of the inspection target 10 is the shape shown in FIG. 8A, the selection unit 114 selects a central cluster group in the x direction as transmitter and receiver clusters 31B, as shown in FIG. 8B. In other words, the clusters 30 included in the central cluster group 31B is sequentially selected as the transmitter clusters, and the clusters 30 included in the central cluster group 31B are simultaneously selected as the receiver clusters.

FIGS. 9A, 9B, 10A, and 10B are diagrams illustrating another example of cluster selection in the radar system according to the first embodiment. FIGS. 9A, 9B, 10A, and 10B show a situation of selecting the cluster according to the position of the traveling direction (x direction) of the inspection target 10 relative to the radar system. FIG. 9A and FIG.

10A show plan views of the inspection target 10 viewed from the upper side of the radar system. When the walking inspection target 10 is inspected, the condition shown in FIGS. 10A and 10B occurs first and then the condition shown in FIGS. 9A and 9B occurs as time elapses. In FIGS. 9A, 9B, 10A, and 10B, the viewing angle of the panel 16 is assumed to be a certain angle. The directivity of the antenna is determined based on the width and the length of the antenna. The viewing angle can be adjusted by adjusting the directivity. It is assumed that the viewing angle of the panel 16 is 30 degrees.

FIG. 9A shows a case where the x-coordinate of the central part of the panel 16 is close to the x-coordinate of the inspection target 10. In this case, the incident angle of the reflected wave of the inspection target 10 to the panel 16 is small. When the antenna interval is one wavelength and an absolute value of the incident angle falls within 30 degrees, the grating lobe appears at an angle of 30 degrees or more. When the position of the inspection target 10 is a position as shown in FIG. 9A and a viewing angle of the panel 16 is ±30 degrees, the grating lobes incident from the outside of the viewing angle can be suppressed. For this reason, the selection unit 114 selects a central cluster group in the x direction as the transmitter and receiver clusters 31C, as shown in FIG. 9B.

FIG. 10A shows a case where the x-coordinate of the central part of the panel 16 is remote from the x-coordinate of the inspection target 10. In this case, the incident angle of the reflected wave to the panel 16 is large. For this reason, when the position of the inspection target 10 is the position shown in FIG. 10A, the grating lobes appeared within the viewing angle of the panel 16, such that the selection unit 114 selects all the clusters 30 as transmitter and receiver clusters 31D, as shown in FIG. 10B.

Thus, combinations of transmitter clusters and receiver clusters in which the reflected wave is not received depending on the body shape or position of the inspection target 10. When the electromagnetic wave is transmitted and received using such useless combinations, a redundant data transfer time and a processing time are wasted. The selection unit 114 adaptively selects the transmitter and receiver clusters that contribute to the inspection, based on the body shape or position of the inspection target 10, and operates only the selected clusters. It is thereby possible to prevent unnecessary transfer of the received signal and to reduce the processing time.

A transmitter module 42 that does not contribute to the inspection may exist even within the same cluster 30, depending on the arrangement of the transmitter modules 42 within the cluster 30. A receiver module 52 that does not contribute to the inspection may exist even within the same cluster 30, depending on the arrangement of the receiver modules 52 within the cluster 30. Furthermore, a transmit antenna 44 that does not contribute to the inspection may exist even within the same transmitter module 42, depending on the arrangement of the transmit antennas 44 within the transmitter module 42. A receive antennas 54 that does not contribute to the inspection may exist even within the same receiver module 52, depending on the arrangement of the receive antennas 54 within the receiver module 52.

For this reason, the selection unit 114 may select all the transmitter modules 42 and all the receiver modules 52 of the selected cluster and make the selected transmitter modules 42 and receiver modules 52 execute the transmitting and receiving or may select several transmitter modules 42 and receiver modules 52 that contribute to the inspection and make the selected transmitter modules 42 and receiver modules 52 execute the transmitting and receiving. The selection unit 114 may select all the transmitter circuits 46 of the transmitter module 42 and make the selected transmitter circuits 46 execute transmitting sequentially or may select several transmitter circuits 46 (i.e., the transmit antennas 44) that contribute to the inspection and make the selected transmitter circuits 46 execute the transmitting sequentially. The selection unit 114 may select all the receiver circuits 56 of the receiver module 52 and make the selected receiver circuits 56 execute the receiving simultaneously or may select several receiver circuits 56 (i.e., the receive antennas 54) that contribute to the inspection and make the selected receiver circuits 56 execute the receiving simultaneously.

The selection unit 114 selects several transmitter modules 42 and several receiver modules 52 that contribute to the inspection, and selects several transmitter circuits 46 and several receiver circuits 56 that contribute to the inspection, according to the criteria as shown in FIGS. 7A to 10B.

Next, yet another example of the antenna selection in the selection unit 114 will be described. FIG. 11 is a view illustrating an example of a normal of the inspection target 10 in the radar system according to the first embodiment. FIG. 12 is a view illustrating a radar coordinate origin in the radar system according to the first embodiment. FIGS. 13A and 13B are views illustrating an allowable angle in the other example of the antenna selection in the radar system according to the first embodiment.

The selection unit 114 obtains the normal of a certain grid point among the grid points indicated by the three-dimensional shape data of the inspection target 10. It is assumed that the selection unit 114 obtains the normal of the grid point with the shortest Euclidean distance from the radar system (for example, panel 16) among the grid points indicated by the three-dimensional shape data of the inspection target 10. The selection unit 114 obtains an angle formed between the normal of the obtained grid point and the radar coordinate origin. The selection unit 114 determines whether to operate the transmit/receive antenna based on the obtained angle. The normal of the grid points depends on the shape and the position of the inspection target 10. The angle formed between the normal and the radar coordinate origin also depends on the shape and the position of the inspection target 10. For this reason, the selection unit 114 selects the transmit/receive antennas based on the shape and the position of the inspection target 10.

The normal of the grid point with the shortest Euclidean distance to the radar system has been used, but normals of all or some of the plurality of grid points in the three-dimensional shape data may be used.

In FIG. 11, the coordinate origin of the three-dimensional shape data is assumed to be the camera coordinate origin, which is the location of the near-infrared camera 20. The radar coordinate origin is the reference point for a certain cluster and is defined as $(x_{rad}, y_{rad}, z_{rad})$ (camera coordinate). The transmit antenna and the receive antenna are assumed to exist on the xy-plane.

FIG. 12 shows an example of the radar coordinate origin $(x_{rad}, y_{rad}, z_{rad})$ of a certain cluster. It is assumed that the transmit antennas 44 are aligned along the y direction and the receive antennas 54 are aligned along the x direction. The y-coordinate of the receive antennas 54 coincides with the y-coordinate of the midpoint of an array of the transmit antennas 44. The y-coordinate of the midpoint of the array of the transmit antennas 44 is referred to as the y-coordinate $y_{rad}$ of the radar coordinate origin. An interval between one side of the substrate of the transmitter module 42 that is closest to the receiver module 52 and one side of the substrate of the receiver module 52 that is closer to the transmitter module 42 is referred to as 2×d1. An x-coordinate of a point at a distance d1 from the transmitter module 42 or a point at a distance d1 from the receiver module 52 is referred to as x-coordinate $x_{rad}$ of the radar coordinate origin. The z-coordinate $z_{rad}$ of the radar coordinate origin is the depth of the inspection target 112 as viewed from the cluster.

A grid point with the shortest Euclidean distance from the radar system is referred to as point s, and coordinates of the point s are referred to as (xs, ys, zs) (camera coordinate system). A vector of a grid point s and a grid point u at the shortest distance from the grid point s is referred to as a vector U. A vector of the grid point s and a grid point v adjacent to the grid point u in the counterclockwise direction is referred to as a vector V.

A normal vector N of the grid point s is obtained from the vectors U and V as follows.

$$N = (U \times V)/(\|U \times V\|)$$

The normal vector N is expressed using unit vectors Xo, Yo, and Zo of the x-axis, the y-axis, and the z-axis as follows.

$$N = xnXo + ynYo + znZo$$

where xn, yn, and zn are coefficients.

An azimuth angle θn and an elevation angle φn in the radar coordinate system of the normal vector N are expressed in equations 1 and 2, respectively.

$$\theta_n = \sin^{-1}\left(\frac{x_n}{\sqrt{x_n^2 + y_n^2 + z_n^2}}\right) \quad \text{Equation 1}$$

$$\phi_n = \sin^{-1}\left(\frac{y_n}{\sqrt{x_n^2 + y_n^2 + z_n^2}}\right) \quad \text{Equation 2}$$

An azimuth angle θs and an elevation angle φs between the grid point s and the radar coordinate origin are expressed by equations 3 and 4, respectively.

$$\theta_s = \sin^{-1}\left(\frac{x_s}{\sqrt{x_s^2 + y_s^2 + z_s^2}}\right) \quad \text{Equation 3}$$

$$\phi_s = \sin^{-1}\left(\frac{y_s}{\sqrt{x_s^2 + y_s^2 + z_s^2}}\right) \quad \text{Equation 4}$$

The selection unit 114 selects the antenna to be operated according to the azimuth angle θs and the elevation angle φs.

When an absolute value of the azimuth angle θs is less than 30 degrees and an absolute value of the elevation angle φs is less than 30 degrees, the selection unit 114 selects the transmitter module and the receiver module included in the cluster that includes the radar coordinate origin.

A case where the absolute value of the azimuth angle θs is 30 degrees or more will be described.

The selection unit 114 selects the antenna by comparing a difference θd=|θn|−|θs| between the azimuth angle θn and the azimuth angle θs, with an allowable angle α, and changes the antenna to be operated.

FIG. 13A shows an example of the angle difference θd in a case where the azimuth angle θs is a negative angle and its absolute value is 30 degrees or more. FIG. 13B shows an example of the angle difference θd in a case where the azimuth angle θs is a positive angle and its absolute value is 30 degrees or more.

FIGS. 14A and 14B are views illustrating an example of the allowable angle α according to the first embodiment. FIG. 14B shows a result of a theoretical calculation of a radar cross section (RCS [dB]) of a 10 mm×10 mm metal plate 130 for the radar incidence angle θ as shown in FIG. 14A. A horizontal axis in FIG. 14B indicates the absolute value of the incidence angle. An example of the theoretical value calculation is shown in Table 14.1 in Chapter 14.2 of M. I. Skolnik, "Radar Handbook", 2nd Edition, McGraw-Hill Publishing Company, New York, 1990. The incidence angle (=approximately 8 degrees) at which the radar cross section is smaller than the maximum value by a predetermined value, for example, −10 dB is referred to as the allowable angle α. It can be understood from FIG. 14B that no side lobes occur if the incidence angle is smaller than the allowable angle α. The allowable angle is not limited to 8 degrees, but may be any other angle.

When the azimuth angle θs is a negative angle and 0<θd<α, then the selection unit 114 operates all the antennas in the cluster.

When the azimuth angle θs is a negative angle and θd<0 or θd>α, then the selection unit 114 does not operate all the antennas and radar.

When the azimuth angle θs is 0 degrees or a positive angle and −α<θd<0, the selection unit 114 operates all the antennas in the cluster.

When the azimuth angle θs is 0 degrees or a positive angle and θd<−α or θd>0, the selection unit 114 does not operate all the antennas and radar.

Next, a case where the absolute value of the elevation angle φs is 30 degrees or more will be described.

The selection unit 114 selects the antenna by comparing angle difference φd=|φn|−|φs| between the elevation angle φn and the elevation angle φs with the allowable angle α, and changes the antenna to be operated.

When the elevation angle θs is a negative angle and 0<θd<α, then the selection unit 114 operates all the antennas in the cluster.

When the azimuth angle φs is a negative angle and θd<0 or θd>α, then the selection unit 114 does not operate all the antennas and radar.

When the azimuth angle φs is 0 degrees or a positive angle and −α<φd<0, the selection unit 114 operates all the antennas in the cluster.

When the azimuth angle φs is 0 degrees or a positive angle and φd<−α or φd>0, the selection unit 114 does not operate all the antennas and radar.

The above descriptions relate to the antenna selection on a cluster basis and, if the radar coordinate origin ($x_{rad}$, $y_{rad}$, $z_{rad}$) is referred to as the position of each antenna, operating/not operating each antenna can be executed according to the azimuth angle θs and the elevation angle φs. An example will be illustrated.

The descriptions return to those of FIG. 5, and the received IF signals (digital signals) of all the selected receiver circuits 56 are output from the cluster 30 and transmitted to the signal processing unit 104. The signal processing unit 104 comprises the distance estimation unit 116 and the direction of arrival estimation unit 118.

The distance estimation unit 116 comprises a fast Fourier transform circuit (FFT circuit). The FFT circuit obtains the intensity of the reflected wave received by the receive antennas 54. In the radar system using the chirp wave, the received IF signal oscillates at a frequency corresponding to the distance between the radar and the target (reflection point). For this reason, the distance estimation unit 116 calculates a range spectrum based on the output signal of the FFT circuit and estimates the range distance (distance to the target) in order from the frequency with higher power. The distance estimation unit 116 transmits the estimation results to the direction of arrival estimation unit 118.

The direction of arrival estimation unit 118 executes the direction of arrival estimation for a specific range distance. The direction of arrival estimation unit 118 extracts the range spectrum corresponding to the frequency of the peak power at each receive antenna. The received signal of each receive array antenna in the far field is expressed as follows. It is assumed that the receive antennas 54 form a two-dimensional array antenna in one receiver module 52.

$$x_{m,n}[r] = \sum_l g_{m,n}(\theta_l, \phi_l) a_{m,n}(\theta_l, \phi_l) s_l^{IF}[r] \quad \text{Equation 5}$$

$$a_{m,n}(\theta_l, \phi_l) = \exp\left(-j\frac{2\pi}{\lambda}(m-1)d\sin\theta_l - j\frac{2\pi}{\lambda}(n-1)d\sin\phi_l\right) \quad \text{Equation 6}$$

$g_{m,n}(\theta_l, \phi_l)$ and $a_{m,n}(\theta_l, \phi_l)$ are an antenna gain and a steering vector of an antenna element (m, n) at an l-th arrival angle $(\theta_l, \phi_l)$.

$S^{IF}_L[r]$ is a complex amplitude of an array reference point at a range distance r.

The direction of arrival estimation estimates the angle of arrival of the reflected wave from the phase difference based on the antenna interval. In addition, the beamforming method, the Capon method, the MUSIC method, or the ESPRIT method may also be used for the direction of arrival estimation method. In this example, the beamforming method is used. In the beamforming method, weights are controlled for each sweep angle (θi, φk) and the main beam of the array antenna is scanned to calculate the output power of the received signal of the array antenna. The weights used here are prepared for PQ that is the number of virtual receiving antennas. The weight is expressed by equation 7.

$$w = [w_{1,1}, w_{1,2}, \ldots w_{P,Q}] \quad \text{Equation 7}$$

$$w_{p,q} = \exp\left(j\frac{2\pi}{\lambda}(p-1)d\sin\theta_i + j\frac{2\pi}{\lambda}(q-1)d\sin\phi_k\right) \quad \text{Equation 8}$$

An output power BF (θi, φk) of beamforming for the angle (θi, φk) is expressed by equation 9.

$$BF(\theta_i, \phi_k) = \frac{wR_{xx}w^H}{ww^H} \quad \text{Equation 9}$$

$$R_{xx} = E[xx^H] \quad \text{Equation 10}$$

$$x = [x_{1,1}, x_{1,2}, \ldots, x_{M,N}] \quad \text{Equation 11}$$

The output power BF (θi, φk) is output from the direction of arrival estimation unit 118.

The display device 106 executes the aperture synthesis processing based on the output power BF (θi, φk) and displays an image of the inspection target 10. The operator looks at the image and determines whether or not the inspection target 10 possesses a hazardous material. A machine learning device may be provided instead of the display device 106. The machine learning device may determine whether the inspection target 10 possesses a hazardous material based on the output power BF (θi, φk).

The radar system according to the first embodiment selects an effective combination of a receiver cluster/receiver module/receiver circuit (i.e., receive antenna) and a transmitter cluster/transmitter module/transmitter circuit (i.e., transmit antenna) based on the three-dimensional shape data of the inspection target 10, and transmits and receives the electromagnetic wave by using the selected combination. Since the received data that does not contribute to the inspection is not collected, the data size of the received data can be kept to the minimum necessary size. For this reason, even if the number of antennas is increased, the data size of received data does not increase, and highly accurate inspection can be executed. Since the data size of the received data is small, the data transfer time and the processing time can be shortened. Furthermore, since the processing time for each electromagnetic wave emission is short, the inspection can be repeated in a short cycle.

Figure 15:
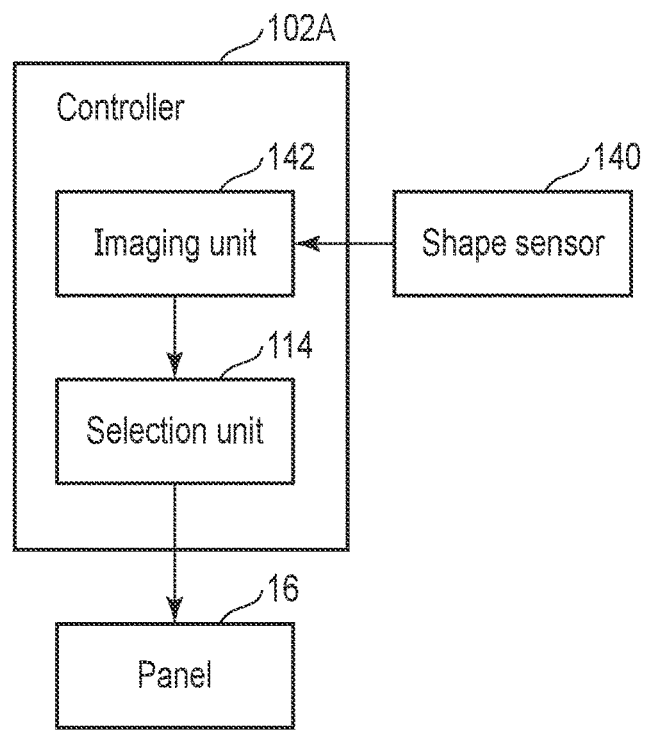
FIG. 15 is a block diagram illustrating another example of a controller in the radar system according to the first embodiment.

FIG. 15 is a block diagram illustrating another example of a controller 102A in the radar system according to the first embodiment. The controller 102A does not comprise the near-infrared light projector 22, the camera 20, and the shape construction unit 112 that the controller 102 comprises. The radar system comprises a shape sensor 140. The controller 102A comprises a communication unit 142 for receiving data from the shape sensor 140. The shape sensor 140 detects the three-dimensional shape of the inspection target 10 and outputs three-dimensional shape data. The communication unit 142 acquires the three-dimensional shape from the shape sensor 140 and transmits the three-dimensional shape data to the selection unit 114.

Figure 16:
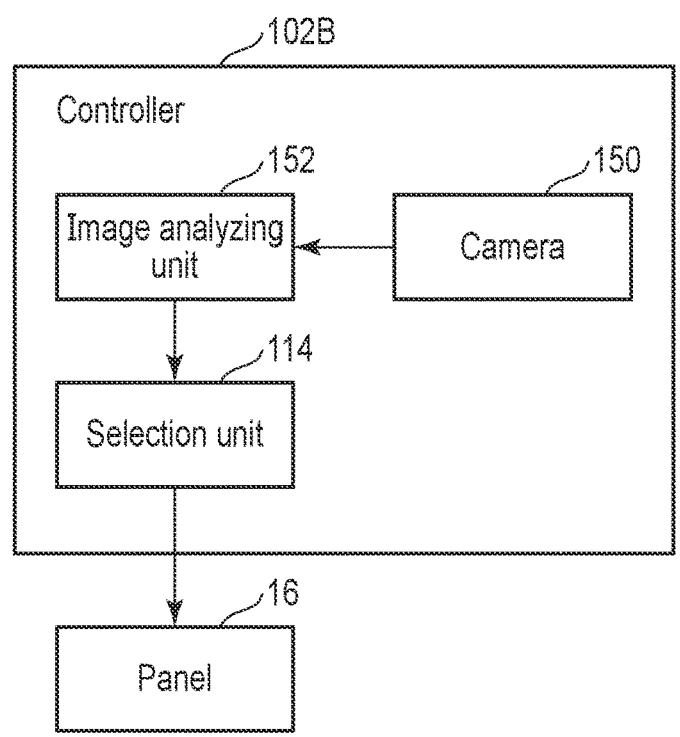
FIG. 16 is a block diagram illustrating another example of the controller in the radar system according to the first embodiment.

FIG. 16 is a block diagram illustrating still another example of a controller 102B in the radar system according to the first embodiment. The controller 102B does not comprise the near-infrared light projector 22, the camera 20, and the shape construction unit 112. The controller 102B comprises a camera 150 and an image analyzing unit 152. The camera 150 captures images of the inspection target 10 in the inspection area. The image analyzing unit 152 analyzes the image captured by the camera 150 using image processing to obtain three-dimensional shape data of the inspection target 10. The image analyzing unit 152 transmits the three-dimensional shape data to the selection unit 114.

According to the controller 102A or 102B the selection unit 114 also can select the combination of the receiver cluster/receiver module/receiver circuit (i.e., receive antenna) and the transmitter cluster/transmitter module/transmitter circuit (i.e., transmit antenna) that contribute to the inspection, depending on the shape, posture, or position of the inspection target 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A radar system for inspecting a target, comprising:
   transmit antennas arranged on a substrate;
   receive antennas arranged on the substrate; and
   a hardware processor connected to the transmit antennas and the receive antennas, wherein:
the processor is configured to:
selectively execute a first operation, a second operation, and a third operation, each of the first operation, the second operation, and the third operation being an operation to select at least one transmit antenna among the transmit antennas and at least one receive antennas among the receive antennas, based on a shape of the target,
make the at least one transmit antenna transmit an electromagnetic wave, and
make the at least one receive antenna receive the electromagnetic wave,
the first operation comprises selecting a first number of transmit antennas and a first number of receive antennas in a case where a surface of the target protrudes toward the substrate, and selecting a second number of transmit antennas and a second number of receive antennas in a case where a surface of the target does not protrude toward the substrate, the second number of the transmit antennas being larger than the first number of the transmit antennas, and the second number of the receive antennas being larger than the first number of the receive antennas,
the second operation comprises detecting an incidence angle of the target with respect to a center of the substrate, based on a position of the target in a direction parallel to the substrate, and selecting a third number of transmit antennas and a fourth number of receive antennas, the third number and the fourth number depending on the incidence angle, and
the third operation comprises obtaining a normal vector of a point on a surface of the target, and selecting the at least one transmit antenna and the at least one receive antenna based on an angle formed by the normal vector viewed from an origin on the substrate.

2. The radar system of claim 1, further comprising:
transmitter modules; and
receiver modules,
wherein:
each of transmitter modules comprises the at least one transmit antenna,
each of the receiver modules comprises the at least one receive antenna,
the processor is configured to select at least one transmitter module among the transmitter modules, and select the at least one transmit antenna in the at least one transmitter module, and
the processor is configured to select at least one receiver module among the receiver modules, and select the at least one receive antenna in the at least one receiver module.

3. The radar system of claim 2, further comprising:
a detector configured to detect the shape of the target and a position of a point on a surface of the target,
wherein the processor is configured to select the at least one transmit antenna and the at least one receive antenna, based on the shape of the target and the position of the point on the surface of the target.

4. The radar system of claim 1, further comprising:
clusters,
wherein
each of the clusters comprises at least one transmitter module and at least one receiver module,
each of the at least one transmitter module comprises the at least one transmit antenna,
each of the at least one receiver module comprises the at least one receive antenna,
the processor is configured to select at least one transmitter cluster among the clusters, select at least one transmitter module in the at least one transmitter cluster, and select the at least one transmit antenna in the at least one transmitter module, based on the shape of the target, and
the processor is configured to select at least one receiver cluster among the clusters, select at least one receiver module in the at least one receiver cluster, and select the at least one receive antenna in the at least one receiver module, based on the shape of the target.

5. The radar system of claim 1, further comprising:
a projector configured to project a first grid pattern onto the target; and
a camera configured to capture a second grid pattern formed on the target,
wherein the processor is configured to output three-dimensional shape data of the target from the first grid pattern and the second grid pattern.

6. The radar system of claim 1, wherein the processor is configured to receive three-dimensional shape data of the target from a sensor.

7. The radar system of claim 1, further comprising:
a camera configured to capture an image of the target,
wherein the processor is configured to analyze the image of the target and create three-dimensional shape data of the target.

8. The radar system of claim 1, wherein the transmit antennas are arranged at an equal antenna interval, and the receive antennas are arranged at an equal antenna interval.

9. The radar system of claim 1, wherein the transmit antennas are arranged at an unequal antenna interval, and the receive antennas are arranged at an unequal antenna interval.

10. The radar system of claim 1, wherein the transmit antennas comprise a minimum redundancy array antenna, and the receive antennas comprise a minimum redundancy array antenna.

11. An inspection method using a radar system comprising transmit antennas arranged on a substrate, receive antennas arranged on the substrate, and a hardware processor, the method comprising:
selectively executing a first operation, a second operation, and a third operation, each of the first operation, the second operation, and the third operation being an operation to select at least one transmit antenna among the transmit antennas and at least one receive antennas among the receive antennas, based on a shape of a target;
determining whether or not a surface of the target protrudes towards the substrate;
making the at least one transmit antenna transmit an electromagnetic wave; and
making the at least one receive antenna receive the electromagnetic wave,
wherein:
the first operation comprises selecting a first number of transmit antennas and a first number of receive antennas in response to a result of the determining indicating that the surface of the target protrudes toward the substrate, and selecting a second number of transmit antennas and a second number of receive antennas in response to the result of the determining indicating that the surface of the target does not protrude toward the substrate, the second number of the transmit antennas being larger than the first number of the transmit antennas, and the second number of the receive antennas being larger than the first number of the receive antennas, the second operation comprises detecting an incidence angle of the target with respect to a center of the substrate, based on a position of the target in a direction parallel to the substrate, and selecting a third number of transmit antennas and a fourth number of receive antennas, the third number and the fourth number depending on the incidence angle, and the third operation comprises obtaining a normal vector of a point on a surface of the target, and selecting the at least one transmit antenna and the at least one receive antenna based on an angle formed by the normal vector viewed from an origin on the substrate.

* * * * *